July 7, 1942. A. PECHUKAS 2,289,328
DECOLORIZATION OF TITANIUM TETRAHALIDES
Filed Feb. 16, 1942
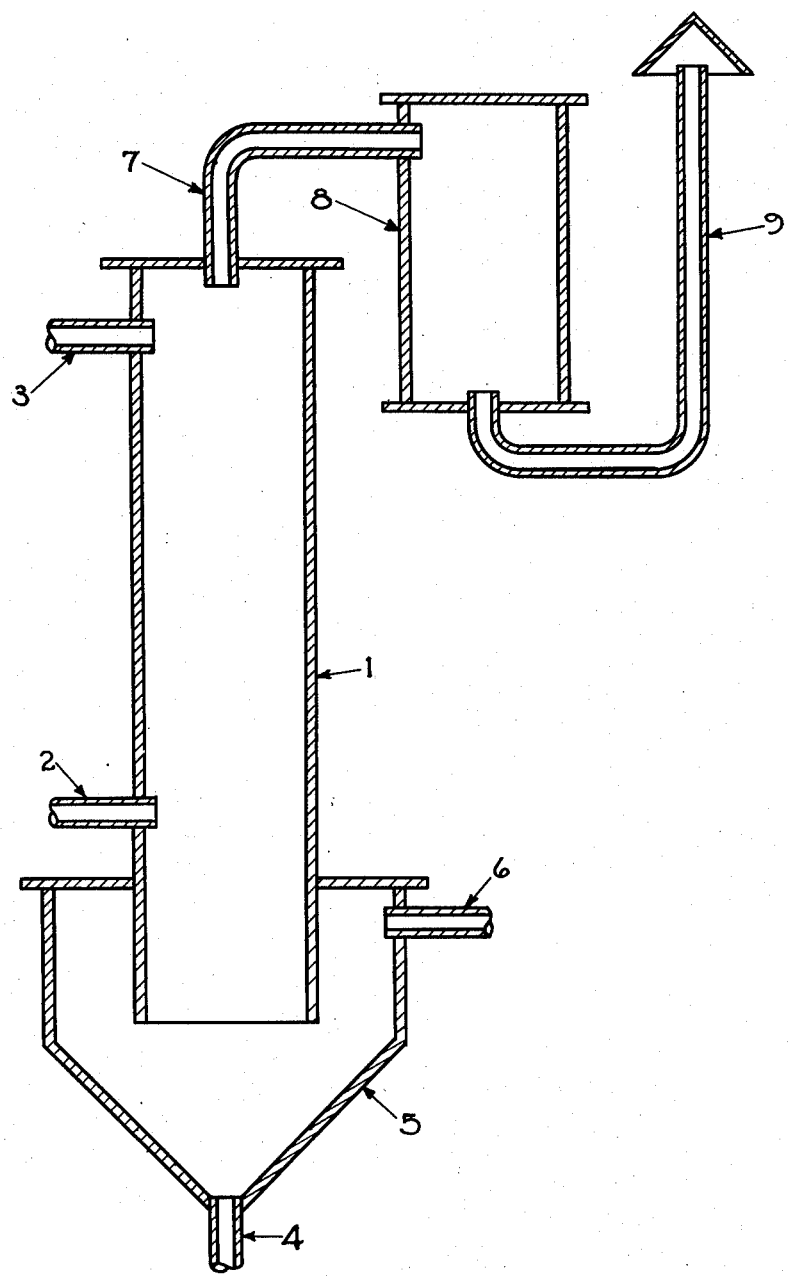
INVENTOR.
ALPHONSE PECHUKAS
BY Raymond S. Chisholm Patented July 7, 1942

2,289,328

UNITED STATES PATENT OFFICE 2,289,328

DECOLORIZATION OF TITANIUM TETRAHALIDES

Alphonse Pechukas, Akron, Ohio, assignor to Pittsburgh Plate Glass Company, Pittsburgh, Pa., a corporation of Pennsylvania Application February 16, 1942, Serial No. 431,000

4 Claims. (Cl. 23—87)

This invention relates to a method of purifying titanium halides and is particularly directed to the removal of color bodies and other impurities from titanium tetrachloride. Titanium tetrachloride as generally prepared by chlorination of titanium bearing materials such as ilmenite generally possesses a yellow or dark brown color which is largely due to the presence of certain impurities in small amounts, such as iron, vanadium, molybdenum, and possibly unidentified impurities. Many of these impurities have low boiling points and are distilled with the titanium tetrachloride. In accordance with the present invention, I have found that a large portion of these impurities may be removed by treating the tetrachloride with a reactive sulphide such as hydrogen sulphide. Other reactive sulphides or hydrosulphides such as organic mercaptans, for example, methyl or ethyl mercaptans, reactive inorganic sulphides, such as arsenious or cuprous sulphide, antimony trisulphide, etc., may be used.

Upon treatment of the titanium tetrachloride with a reactive sulphide such as hydrogen sulphide, a brown or black precipitate generally is formed which contains a portion of the impurities. For example, a large portion of the vanadium and iron is removed in this manner. Other materials such as arsenic, antimony, or tin may be precipitated to a substantial degree, if such materials are present. In some cases a small quantity of titanium may be precipitated, but in general, treatment is discontinued before more than two or three percent of the titanium is precipitated.

If desired, the process may be conducted by treating with hydrogen sulphide complexes such as the addition compounds formed by reaction of $H_2S$ with titanium tetrachloride or other titanium tetrahalide. These materials may be prepared, for example, by introduction of $H_2S$ under pressure into titanium tetrachloride. The mixture thus obtained may be added to the titanium tetrachloride to be treated.

It has been found that the sulphides such as hydrogen sulphide not only remove precipitable impurities but also reduce to a lower valent state impurities which are present in the liquid, whereby a more effective separation of such materials may be secured upon subsequent distillation of the titanium tetrachloride. This insures a more complete removal of the color bodies in the titanium tetrachloride.

The precipitate may be removed from the liquid tetrachloride by decantation and/or filtration or the liquid may be distilled from the precipitate. Prior to distillation, the liquid is generally dark red in color. This color is largely due to the conversion of certain of the impurities which are not precipitated to a different form. Upon distillation, however, titanium tetrachloride of good color is secured. Thus, it is found that many of the unprecipitated impurities are converted into products possessing high boiling points and no longer distil with the titanium tetrachloride.

The treatment is conducted generally at or near room temperature, although higher or lower temperatures are permissible.

In certain cases, vaporized titanium tetrachloride may be contacted with hydrogen sulphide for the purpose of purifying the tetrachloride but undesirable large amounts of titanium sulphide may be formed in such process unless the proportions of hydrogen sulphide to titanium tetrachloride is kept low. The treatment may be conducted under pressure, if desired.

The process is generally conducted in the substantial absence of chlorine, hydrogen chloride, or water vapor, in order to avoid additional reactions which tend to complicate the problem. Thus, it will be apparent that the liquid undergoing treatment is substantially anhydrous. The residual liquid after treatment with $H_2S$ may be treated with inert gases to remove $H_2S$ or may be subjected to the action of sulphur dioxide to remove the hydrogen sulphide. Treatment with sulphur dioxide in this manner generally produces a product of higher purity and better color.

In treating titanium tetrachloride with $H_2S$ difficulty may be encountered in securing initiation of the precipitation of impurities. Thus, it is occasionally observed that when hydrogen sulphide is bubbled through a pool of liquid titanium tetrachloride no precipitate is formed. In such a case, while the tetrachloride after distillation is found to be of increased purity, the liquid often possesses some color. The reason why precipitation occurs in some cases and not in others is as yet undetermined.

In accordance with the present invention, applicant has found that precipitation of impurities always occurs if the treatment is conducted by flowing a film of liquid titanium tetrachloride over a solid surface while contacting the film with gaseous $H_2S$. The thickness of the film is capable of some variation, but in general, does not exceed 0.05 inch. This process may be effectively performed by permitting the liquid titanium tetrahalide to percolate through a tower packed with a porous bed of discrete solid bodies of various sizes, generally at least about one-fourth inch in diameter, while permitting gaseous H₂S to flow through the tower.

The process will be more fully understood by reference to the accompanying drawing which is a diagrammatic sectional view of a suitable apparatus for performing the process. The apparatus comprises a tower 1, provided with a receptacle 5, for collecting treated titanium tetrachloride. The tower is packed with a porous bed of inert solid particles such as carbon rings, glass beads, silica chips, etc., which provide a surface upon which the titanium tetrachloride may flow. This bed should be sufficiently porous to permit ready flow of gas and liquid therethrough. In the operation of the process a stream of liquid titanium tetrachloride is introduced through inlet 3, and is allowed to flow downwardly through the bed, and is collected at the base of the tower in reservoir 5. Preferably, the level of the liquid tetrachloride is maintained such that the bed or a major portion thereof of carbon rings or similar material remains above the liquid level and is not immersed in the liquid. Thus, the gaseous phase in the treating tower is substantially continuous. Hydrogen sulphide is introduced at the base of the column at 2 and is permitted to flow upwardly through the tower in contact with the tetrachloride and finally escapes through the outlet 7, where it may be vented into a suitable exhaust system including a chamber 8, in which occluded TiCl₄ may settle out provided with a conduit 9, for exhausting the H₂S.

Treated titanium tetrachloride containing precipitated impurities is collected in the reservoir and permitted to settle. A portion of the titanium tetrachloride and the settled precipitate is withdrawn from outlet 4. The remaining titanium tetrachloride substantially free from precipitate is withdrawn through outlet 6, and after heating to remove dissolved H₂S is distilled to produce a water white product.

In accordance with a further modification the process may also be conducted by cocurrent treatment of the titanium tetrachloride with H₂S. This may be done by use of the apparatus previously discussed. In such a case, the process is conducted as previously described with the exception that the direction of flow of H₂S is reversed by introducing this agent through the pipe and withdrawing unabsorbed H₂S throuph pipe 6. The following examples are illustrative:

Example I

A stream of gaseous hydrogen sulphide was introduced into a quantity of yellow titanium tetrachloride containing 0.25 percent of vanadium and 0.0002 percent of iron at a temperature of 25° C. and a brownish black precipitate was formed. Upon removal of the precipitate the liquid titanium tetrachloride was dark red. The red liquor was distilled and practically pure water white titanium tetrachloride which was free of vanadium and iron was secured.

Example II 2.5 parts by weight of arsenious sulphide was mixed with 180 parts by weight of yellow titanium tetrachloride which contained a small amount of vanadium. The mixture was then distilled and water white titanium tetrachloride was obtained.

Example III

A column 4 inches in diameter was packed with carbon rings ½ inch in diameter to form a porous bed 5 feet deep. Yellow liquid titanium tetrachloride containing 0.08 percent vanadium was allowed to trickle over the bed at a rate of 7 gallons per hour and dry gaseous hydrogen sulphide was introduced into the base of the bed at a rate of 10 cubic feet per hour. Treated titanium tetrachloride was collected at the base of the bed. Upon distillation of the treated liquid water-white anhydrous titanium tetrachloride was secured.

While the invention is particularly directed to the removal of color from titanium tetrachloride, it may be applied to the removal of color from other tetrahalides such as titanium tetrafluoride or titanium tetrabromide.

Although the present invention has been described with reference to the specific details of certain embodiments thereof, it is not intended that such details shall be regarded as limitations upon the scope of the invention, except insofar as included in the accompanying claims.

This application is a continuation-in-part of application Serial No. 308,008, filed December 7, 1939.

I claim:

1. A method of purifying a substantially anhydrous titanium tetrahalide which contains a metallic impurity which comprises forming a porous bed of solid discrete inert elements, permitting a stream of the titanium terachloride in substantially anhydrous liquid state to percolate through the bed and introducing gaseous H₂S into the bed to cause precipitation of an impurity from the tetrahalide.

2. A method of purifying a substantially anhydrous titanium tetrahalide which contains a metallic impurity which comprises flowing a film of the tetrahalide in substantially anhydrous liquid state over a solid surface and establishing an atmosphere containing sufficient H₂S to cause precipitation of an impurity from the tetrahalide in contact with the film.

3. A method of purifying a substantially anhydrous titanium tetrachloride which contains a metallic impurity which comprises forming a porous bed of solid discrete inert elements, permitting a stream of the titanium tetrachloride in substantially anhydrous liquid state to percolate through the bed and introducing gaseous H₂S into the bed to cause precipitation of an impurity from the tetrachloride.

4. A method of purifying a substantially anhydrous titanium tetrachloride which contains a metallic impurity which comprises flowing a film of the tetrahalide in substantially anhydrous liquid state over a solid surface and establishing an atmosphere containing sufficient H₂S to cause precipitation of an impurity from the tetrachloride in contact with the film.

ALPHONSE PECHUKAS.